Sept. 8, 1936.     R. W. GEMMELL     2,053,428
CONTROL SYSTEM
Filed June 15, 1935

WITNESSES:
E. A. McCloskey
Wm. C. Groome

INVENTOR
Robert W. Gemmell.
BY
M. J. Crawford
ATTORNEY

Patented Sept. 8, 1936

2,053,428

UNITED STATES PATENT OFFICE 2,053,428

CONTROL SYSTEM

Robert W. Gemmell, Pittsburgh, Pa., assignor to Westinghouse Electric & Manufacturing Company, East Pittsburgh, Pa., a corporation of Pennsylvania Application June 15, 1935, Serial No. 26,840

9 Claims. (Cl. 290—17)

My invention relates, generally, to control systems and more particularly to systems for regulating the operation of internal combustion engines which are utilized to drive electric generators.

Numerous schemes have been proposed and utilized for regulating the speed of an internal combustion engine, which drives a generator, by so controlling the torque requirements of the generator that a practically constant engine speed is maintained. In the prior schemes, an indication of a change in the speed of the engine is obtained by utilizing the voltage of either a pilot generator or an auxiliary generator or exciter for the main generator of the power system, all of which are driven by the engine. Since the voltage of the pilot generator or the exciter is approximately proportional to the engine speed, it is used to operate the regulating element for the powers system.

However, in such a system it is necessary to provide a separate pilot generator, which entails additional expense, or to utilize the voltage of the auxiliary generator or exciter as an indication of the engine speed. The latter method has not proven entirely satisfactory in all cases, especially where the auxiliary generator is subjected to highly fluctuating loads, as, for example when the auxiliary generator supplies the excitation current for the main generator of a Diesel-electric locomotive and also supplies current for operating the air conditioning equipment for the train being hauled by the locomotive. The load fluctuations produce variations in the generator voltage which cause erratic operation of the system for regulating the speed of the engine.

An object of my invention, generally stated, is to provide a control system for regulating the speed of an internal combustion engine which shall be simple and efficient in operation and which may be economically manufactured and installed.

A more specific object of my invention is to provide a system for regulating the speed of an internal combustion engine which is directly responsive to the speed of the engine.

Another object of my invention is to provide a system for regulating the speed of an internal combustion engine which is not affected by fluctuations in the load on the generating apparatus driven by the engine.

A further object of my invention is to prevent hunting or surging of a speed regulating system.

Other objects of my invention will be explained fully hereinafter or will be apparent to those skilled in the art.

In accordance with the preferred embodiment of my invention, an internal combustion engine is utilized for driving a main generator to generate current for operating the propelling motors of a locomotive and also an auxiliary generator which supplies excitation current for the main generator. A speed regulator of the magnetic drag type, which is driven by the engine shaft, and is, therefore, directly responsive to the speed of the engine, is provided for controlling the excitation current of the main generator, thereby controlling the load and the torque requirements of the main generator to regulate the speed of the engine.

For a fuller understanding of the nature and objects of my invention, reference may be had to the following detailed description, taken in conjunction with the accompanying drawing, in which.

Figure 1:
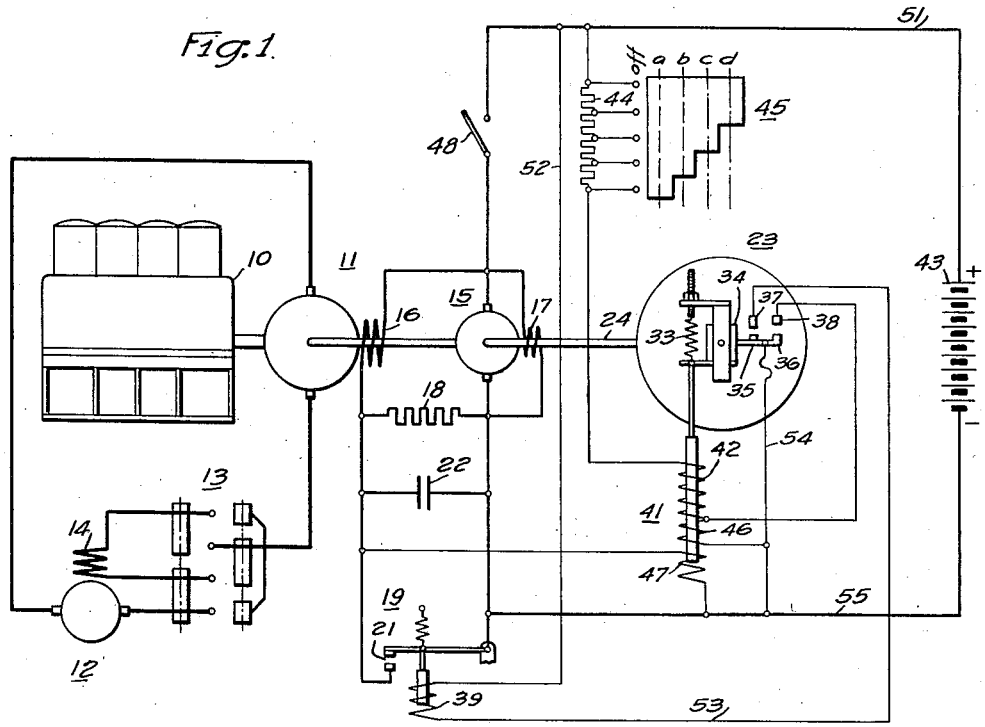
Figure 1 is a diagrammatic view of a control system embodying my invention.

Referring to the drawing, and particularly to Fig. 1, an internal combustion engine 10 is utilized for driving an electric generator 11. The generator 11 supplies the current for operating an electric motor 12, which may be of a type suitable for propelling a locomotive (not shown). A reversing switch 13 is provided for reversing the current in the field winding 14 of the motor 12, thereby controlling the direction of rotation of the motor. An auxiliary generator or exciter 15 is provided for energizing the field winding 16 of the main generator 11. The exciter 15 may be of the shunt wound type having a shunt field winding 17.

In order that the excitation current of the main generator 11 may be varied, a resistor 18 is connected in series with the field winding 16 of the generator 11, and a resistor shunting switch 19 is provided for shunting the resistor 18 from the field winding circuit. It will be understood that when the contact members 21 of the switch 19 are closed to shunt the resistor 18, a maximum amount of excitation current is supplied the generator 11 by the exciter 15. Also, when the contact members 21 of the switch 19 are opened to insert the resistor 18 in the field winding circuit, a minimum amount of excitation current is supplied the generator 11. Thus, it will be seen that the excitation of the generator 11 may be controlled by controlling the operation of the switch 19 to vary the time during which its contact members are closed relative to the time during which the contact members are open. If desired, a condenser 22 may be connected across the contact members 21, as shown, to limit the sparking of these contact members, in a manner well known in the art.

In this manner, the excitation current of the generator 11 may be varied to control the load carried by the generator and consequently the torque required to drive the generator. Therefore, the speed of the engine 10 may be regulated by varying the torque requirements of the generator 11. Thus, the speed of the engine may be increased by decreasing the excitation current of the generator 11, and, likewise, the speed of the engine may be decreased by increasing the excitation current to increase the load carried by the generator 11.

In order that variations in the speed of the engine 10 may be utilized to control the operation of the resistor shunting switch 19 to vary the excitation current of the generator 11, in the manner hereinbefore described, a speed regulating relay 23 is connected to the engine shaft 24, thereby being mechanically driven by the engine. The relay 23 is of the magnetic drag type and is more fully described in the copending application of W. R. Taliaferro, Serial No. 17,969, filed April 24, 1935.

Figure 2:
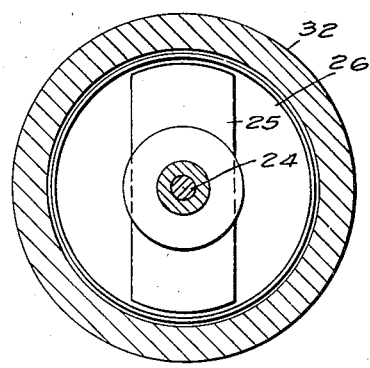
Fig. 2 is a view, in section, taken along the line II—II of Fig. 3, of a relay of the magnetic drag type, which is utilized in the control system.
Figure 3:
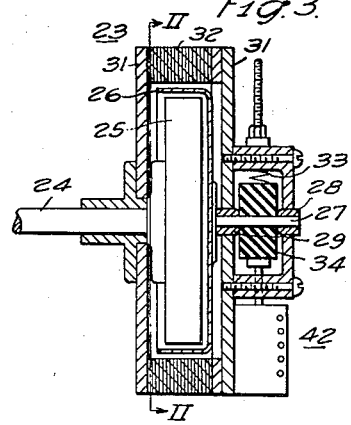
Fig. 3 is a view, in section, of the relay shown in Fig. 2.

As shown in Figs. 2 and 3, the relay 23 comprises a rotating magnet 25, which is driven by the engine shaft 24. The magnet 25 is concentrically disposed within a rotatable cup 26, which may be composed of copper or other suitable non-magnetic material. The cup 26 is carried by a shaft 27, which is supported by bearings 28 and 29 mounted in a framework 31. A laminated ring 32 is supported by the frame 31 and surrounds the magnet 25 and the cup 26, thereby providing a magnetic path for the flux produced by the magnet 25.

In this manner, a magnetic drag or torque is produced on the cup 26 by the rotating magnet 25 which is proportional to the speed of rotation of the magnet 25 and the speed of the engine 10, since the magnet 25 is driven by the engine shaft 24. The rotation of the cup 26 is opposed by an adjustable spring 33, disposed to bias a contact block 34, which is mounted on the shaft 27 of the cup 26, to a predetermined position. Contact members 35 and 36 are carried by the contact block 34, as shown in Fig. 1, and are disposed to engage contact members 37 and 38, respectively, when the torque developed by the rotating magnet 25 is sufficient to overcome the tension of the spring 33. In this manner, the relay 23 is so constructed that it is directly responsive to the speed of the engine 10 and the relay may be utilized to control the energization of the actuating coil 39 of the resistor shunting switch 19, thereby controlling the generator excitation current and regulating the speed of the engine 10.

It will also be understood that, if desired, the contact members of the relay 23 may be directly utilized to shunt the resistor 18, thereby varying the excitation current of the generator 11 to regulate the engine speed without providing the resistor shunting switch 19. However, when controlling a generator of a comparatively large size, it will be found expedient to utilize a separate resistor shunting switch, as herein illustrated.

In order to obtain a plurality of different speed settings for the relay 23, a solenoid 41, which is energized by a coil 42, may be so connected to the relay 23 that it opposes the action of the spring 33. The coil 42 may be energized from a control battery 43, or other suitable source of control potential. The current in the coil 42 may be controlled by means of a resistor 44, which may be shunted step-by-step from the circuit through the coil by means of a control switch 45 of the drum type.

In order to reduce the hunting or surging action of the regulating system, provision is made for shunting a portion 46 of the solenoid coil 42 by means of the contact members 36 and 38 of the relay 23, when these contact members are closed by the torque produced by the rotating magnet 25. The relay is so constructed and connected in the regulating system that its contact members are closed when the engine attains a speed which causes sufficient torque to be developed in the relay 23 to overcome the spring 33. The coil 42 opposes the spring 33, thereby aiding the relay torque to close the contact members. Since the shunting of a portion of the coil 42 reduces the magnetic effect of the coil the spring 33 is enabled to open the contact members of the relay slightly before the engine has decreased to the speed otherwise permitted by the relay 23. In this manner, overshooting of the engine speed is prevented which reduces the hunting or surging action usually experienced in speed regulating systems.

If desired, a further means of preventing hunting may be provided by adding an additional coil 47 on the solenoid 41 to increase the effect of the solenoid in opposing the spring 33. As shown, the coil 47 may be connected in parallel with the resistor 18, thereby being shunted by the closing of the contact members 21 of the resistor shunting switch 19. Since the shunting of the resistor 18 by the contact members 21 increases the excitation current of the generator 11 and decreases the engine speed, in the manner hereinbefore described, the shunting of the coil 47 simultaneously with the resistor 18 permits the spring 33 to open the contact members of the relay 23 before the engine has decreased to its minimum speed permitted by the normal setting of the relay 23. Likewise, the coil 47 prevents overshooting when the engine speed is being increased by the relay 23, since the coil 47 is energized at this time and it will cause the contact members of the relay 23 to be closed slightly before the maximum speed of the engine is attained.

As shown, the battery 43 is utilized to supply current for operating the control apparatus, such as the resistor shunting switch 19 and the solenoid device 41. The exciter or auxiliary generator 15 may be utilized to charge the battery 43 by closing a switch 48 to connect the battery 43 across the generator 15.

In order that the functioning of the foregoing apparatus may be more clearly understood, the operation of the control system will now be briefly described. Assuming that the engine 10 is driving the generator 11 and that the engine throttle (not shown) has been so set that the engine 10 may operate at a desired speed, the regulating system hereinbefore described will function to maintain the desired speed of the engine 10 by controlling the excitation current of the generator 11 to vary the torque requirements of the generator. The speed setting of the relay 23 may be adjusted by means of the adjustable spring 33. Furthermore, the relay speed setting may be remotely controlled by means of the control switch 45, which shunts the resistor 44 to vary the current in the solenoid coil 42.

As shown, when the control switch 45 is in position "a", the entire resistor 44 is shunted from the circuit of the coil 42 and the solenoid 41 has its maximum effect. Therefore, the engine 10 will operate at its minimum speed for a predetermined throttle opening. By inserting the resistor 44 in the circuit of the coil 42 step-by-step, the effect of the solenoid 41 is decreased, which increases the engine speed since more torque is required in the relay 23 to overcome the spring 33. When the controller 45 is in the "off" position the engine throttle is set for idling speed and no regulation is required.

When the engine 10 attains a predetermined speed, the contact members 35 and 37 of the relay 23 are closed by the torque produced by the rotating magnet 25, thereby energizing the actuating coil 39 of the resistor shunting switch 19, which closes the contact members 21 of this switch to shunt the resistor 18 from the circuit of the field winding 16 of the generator 11. The energizing circuit for the actuating coil of switch 19 extends from the positive terminal of the battery 43 through conductors 51 and 52, the coil 39, conductor 53, contact members 35 and 37 of the relay 23, and conductors 54 and 55 to the negative terminal of the battery 43.

As hereinbefore described, the shunting of the resistor 18 increases the excitation current of the generator 11, thereby increasing the load carried by the generator and increasing the torque on the engine 10, which will decrease the engine speed for a fixed throttle setting. When the engine speed is reduced a sufficient amount to permit the spring 33 to open the contact members of the relay 23, the resistor shunting switch is opened and the resistor 18 is inserted in the field winding circuit to decrease the torque requirements of the generator 11, which permits the engine speed to be increased. When the engine attains a predetermined speed, the contact members of the relay 23 are again closed and the cycle of operation is repeated.

In this manner, the speed of the engine 10 is regulated by the regulator 23, which is directly responsive to the engine speed, thereby overcoming certain of the difficulties encountered in previously known systems for regulating the speed of internal combustion engines, which are utilized for driving the generators of Diesel-electric or gas-electric locomotives. As stated hereinbefore, previously known regulating systems have either required an independent pilot generator for operating the regulating equipment, or have been subject to fluctuations in the electrical load imposed on the generating equipment of the power system, which causes erratic operation of the regulating system.

The system herein described is directly responsive to the speed of the engine 10, and is not affected by any fluctuations in the load which may be imposed on the generator 15 by such auxiliary equipment as air-compressor motors, battery charging and the air conditioning equipment utilized on modern trains.

I do not desire to be restricted to the specific embodiment of my invention herein shown and described, since it is evident that it may be changed and modified without departing from the spirit and scope of my invention as defined in the appended claims.

I claim as my invention:

1. In a power system, in combination, an electric generator, an internal combustion engine for driving the generator, a source of direct current for exciting the generator, means directly responsive to the speed of the engine for controlling the generator excitation current to vary the torque of the generator, thereby regulating the speed of the engine, and electro-responsive means for reducing hunting of said speed-responsive means.

2. In a power system, in combination, an electric generator, an internal combustion engine for driving the generator, a source of direct current for exciting the generator, means mechanically driven by the engine and directly responsive to its speed for controlling the generator excitation current to vary the torque of the generator, thereby regulating the speed of the engine, and electro-responsive means for reducing hunting of said speed-responsive means.

3. In a power system, in combination, an electric generator, an internal combustion engine for driving the generator, a source of direct current for exciting the generator, means for varying the generator excitation current to control the generator torque, means directly responsive to the engine speed for controlling the operation of said last named means, thereby regulating the speed of the engine, and electro-responsive means for reducing hunting of said speed-responsive means.

4. In a power system, in combination, an electric generator, an internal combustion engine for driving the generator, a source of direct current for exciting the generator, a resistor for controlling the generator excitation current, means for shunting said resistor to control the generator torque, and means mechanically driven by the engine and directly responsive to the engine speed for controlling the operation of said resistor shunting means, thereby regulating the speed of the engine, and electro-responsive means for reducing hunting of said speed-responsive means.

5. In a power system, in combination, an electric generator having a field winding, an exciter for energizing the field winding, an internal combustion engine for driving the generator and the exciter, a speed regulator for controlling the energization of said generator field winding, said speed regulator having a rotating magnet driven by the engine and a rotatable member actuated by the rotating magnet to effect the control of the generator excitation current, and electro-responsive means for changing the speed setting of said regulator.

6. In a power system, in combination, an electric generator having a field winding, an internal combustion engine for driving the generator, means for supplying excitation current for the generator field winding, a speed regulator for controlling said excitation current to vary the generator torque, said regulator having a rotating magnet driven by the engine, a rotatable member disposed concentric with the rotating magnet and actuated thereby in accordance with the speed of the engine, and remotely controlled electro-responsive means for changing the speed setting of said regulator.

7. In a power system, in combination, an electric generator having a field winding, an internal combustion engine for driving the generator, means for supplying excitation current for the generator field winding, a speed regulator for controlling said excitation current to vary the generator torque, said regulator having a rotatable member, a rotating magnet driven by the engine and concentrically disposed within the rotating member to produce a torque thereon proportional to the engine speed, a spring for biasing the rotatable member to a predetermined position, electro-responsive means for changing the speed setting of said regulator, and means for remotely controlling the energization of said electro-responsive means.

8. In a power system, in combination, an electric generator having a field winding, an internal combustion engine for driving the generator, means for supplying excitation current for the generator field winding, a speed regulator for controlling said excitation current to vary the generator torque, said regulator having a rotatable member, a rotating magnet driven by the engine and concentrically disposed within the rotating member to produce a torque thereon proportional to the engine speed, a spring for biasing the rotatable member to a predetermined position, and electro-responsive means disposed to oppose said spring to reduce hunting of the regulator.

9. In a power system, in combination, an electric generator having a field winding, an internal combustion engine for driving the generator, means for supplying excitation current for the generator field winding, a speed regulator for controlling said excitation current to vary the generator torque, said regulator having a rotatable member, a rotating magnet driven by the engine and concentrically disposed within the rotating member to produce a torque thereon proportional to the engine speed, a spring for biasing the rotatable member to a predetermined position, electro-responsive means disposed to oppose said spring to reduce hunting of the regulator, and contact members actuated by the rotatable member of said regulator to control the energization of said electro-responsive means.

ROBERT W. GEMMELL.